United States Patent [19]

Smith

[11] Patent Number: 5,370,079
[45] Date of Patent: Dec. 6, 1994

[54] CONTAINER AND METHOD FOR TRANSPORTING LABORATORY ANIMALS

[75] Inventor: Roger W. Smith, Grove City, Ohio

[73] Assignee: Charles River Laboratories, Wilmington, Mass.

[21] Appl. No.: 57,070

[22] Filed: May 3, 1993

[51] Int. Cl.⁵ .............................................. A01K 1/03
[52] U.S. Cl. .................................. 119/19; 229/125.21
[58] Field of Search ................ 119/15, 19; 229/120.1, 229/125.24, 125.38, 226, 239, 125.21, 125.37, 125.39

[56] References Cited

U.S. PATENT DOCUMENTS

| | | | |
|---|---|---|---|
| 380,861 | 4/1888 | Collins | 119/19 X |
| 2,026,417 | 12/1935 | Conway et al. | 119/19 |
| 2,277,674 | 3/1942 | Belsinger | 229/125.21 X |
| 2,760,629 | 8/1956 | Thagard, Jr. | 229/125.37 X |
| 3,238,922 | 3/1966 | Trexler | 119/15 |
| 3,306,258 | 2/1967 | Hunt | 119/19 |
| 3,447,733 | 6/1969 | Smith et al. | 229/239 X |
| 4,736,707 | 4/1988 | christie | 119/1 |
| 4,907,536 | 3/1990 | Chrisler | 119/15 |
| 4,928,630 | 5/1990 | Kupermit | 119/17 |
| 4,976,219 | 12/1990 | Goguen | 119/15 |
| 5,174,241 | 12/1992 | Goguen | 119/15 |

FOREIGN PATENT DOCUMENTS 2668127  4/1992  France ................ 119/15

Primary Examiner—Robert P. Swiatek
Attorney, Agent, or Firm—Craig E. Larson; John E. Thomas; Denis A. Polvn

[57] ABSTRACT

A container for transporting laboratory-type animals comprises a base and a lid, wherein the base and the lid when assembled define a volume for receiving one or more laboratory animals therewithin. The base includes a flange for contacting the lid, wherein the lid is removably attached to the flange of the base with removable stitching.

7 Claims, 3 Drawing Sheets

CONTAINER AND METHOD FOR TRANSPORTING LABORATORY ANIMALS

BACKGROUND OF THE INVENTION

This invention concerns containers for transporting animals, especially laboratory animals.

Smaller laboratory animals such as mice, rats, rabbits, hamsters, gerbils, and the like are generally shipped from a supplier to a laboratory in shipping crates formed of cardboard and lined with wire mesh. For example, Charles River Laboratories regularly uses crates constructed of die cut corrugated cardboard and metal screen materials and secured by metal staples. The constructed crates include six side-positioned vent areas covered with an air-filtration material which is permeable to air and minimizes passage of airborne contaminates into the crates. The crates are designed with slant-in sidewalls to enable air passage between crates that are stacked on pallets during transport.

Typical crates are sized about 24.5 inches in length, 16.5 inches in width, and 5.5 inches in height for transport of up to about thirty mice or up to about eight rats. A higher crate—about 10 inches in height—is typically used for the transport of up to two guinea pigs. In general, crates are sized to maximize transport efficiency on pallets.

The crates are also designed to properly support animal health during the shipping period. While shipping periods are variable, proper design generally assumes a period of at least 72 hours, even though most deliveries will be completed within a 48-hour period.

As noted above the crates are typically corrugated cardboard. An interior lining or coating is generally provided to make the crate impervious to animal wastes. A further interior lining is generally provided to prevent the animals from gnawing or chewing through the container.

The crates are constructed from two exterior parts: a base and a lid. The lid will usually be partially attached to the base before introducing animals for shipment. After the animals are loaded the remainder of the lid is attached to the base. When unloading the animals after shipment, the process is reversed.

A principal difficulty with the crates currently in use is that they are difficult to open. One method for attaching the lid of the container to the base is stapling. However, not only is the stapled container difficult to open, the staples protruding around the edges of the opened container are hazardous to both the animal and its handler. Another method is to add a perforated tear-strip along the top, front edge of the crate. However, the strip often does not function properly or easily and, to complete opening from the end to the mid-crate area, the two side edges of the lid must be lifted against the strength of the stapled corrugated materials, resulting in torn corrugated and uneven tear lines.

SUMMARY OF THE INVENTION

The present invention provides an easy-to-use container for transporting laboratory animals which is safe for the animals and their handlers. The container comprises a base and a lid, said base and lid when assembled defining a volume for receiving one or more laboratory animals therewithin, the base including a flange for contacting the lid, said lid being removably attached to the flange of said base with removable stitching. The stitching is preferably single thread chain stitching.

The present invention also provides a method of transporting laboratory animals which comprises:

(a) providing a container comprising a base and a lid, said base and lid when assembled defining a volume for receiving one or more laboratory animals therewithin, the base including a flange for contacting the lid, the lid being foldable along a fold line defining (i) a first lid portion removably attached to the flange with removable stitching and (ii) a second lid portion;

(b) placing one or more animals into the container;

(c) closing the container by attaching the second lid portion to the flange;

(d) transporting the container to its destination;

(e) removing the stitching and folding back the first lid portion along the fold line, and (f) removing the animals from the container.

DETAILED DESCRIPTION OF INVENTION

Figure 1:
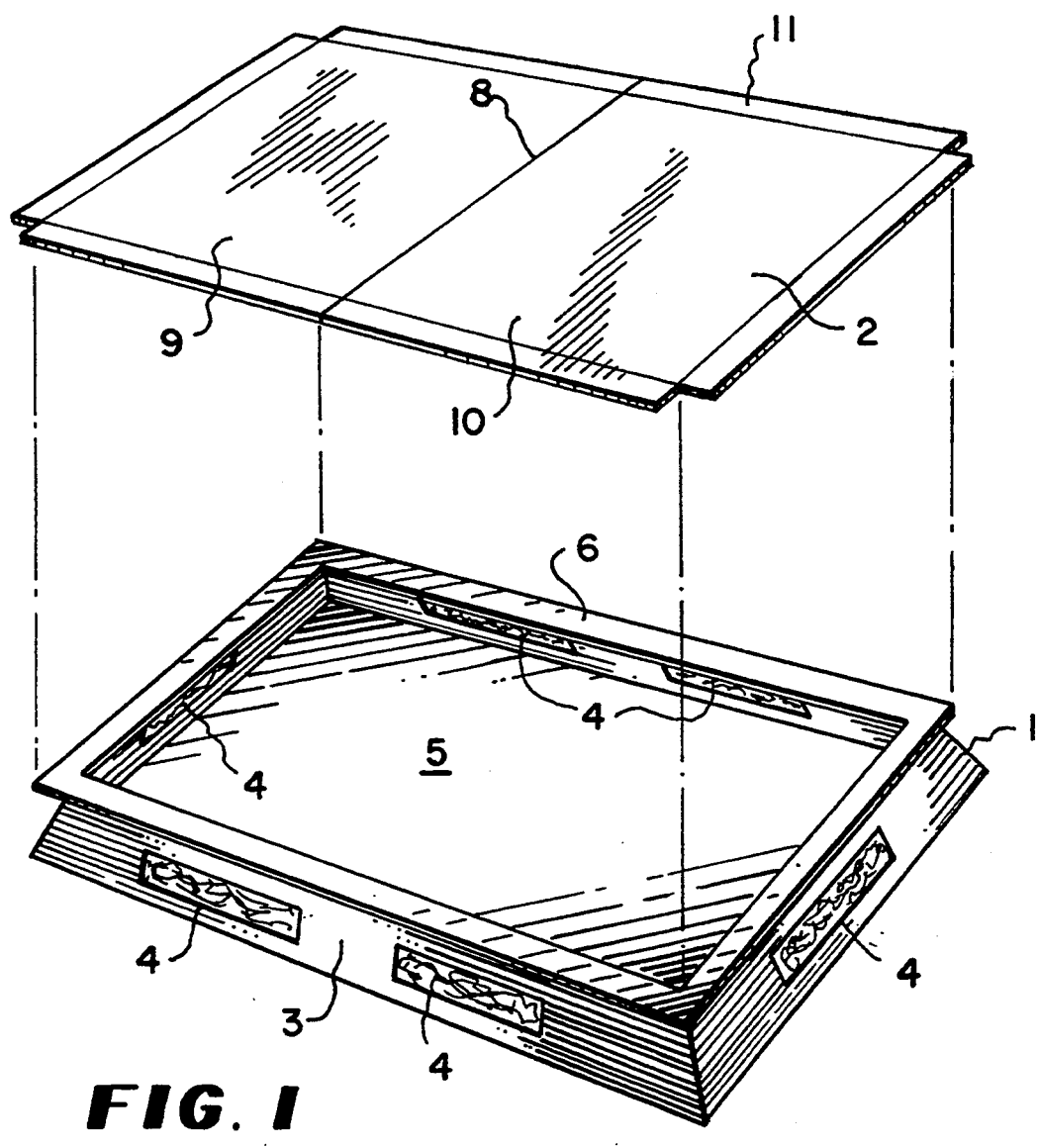
FIG. 1 is an exploded perspective view of the base and lid of the container according to preferred embodiments of the invention.

As illustrated in FIG. 1, the container comprises base 1 and lid 2. The base includes side walls 3, bottom 5, and flange 6 for contacting the lid when placed on the base. In the illustrated embodiment, flange 6 extends around the periphery of the base, such as around the entire periphery of the base at the upper end of the side walls. Preferably, side walls 3 are slanted inwardly, as shown in FIG. 1, although the walls may assume other configurations such as a vertical configuration.

The container should be impervious to animal waste, so the container may be constructed of waxcoated corrugated cardboard. However, other materials such as plastics may be used as will be apparent to those skilled in the art.

In order to provide air to animals contained in the container, vents 4 may be provided in the side walls. Preferably, the vents are lined with a filter material which is air-permeable but prohibits passage of airborne contaminants therethrough. An example of such a material is spun polyester, although other materials may be used as will be apparent to those skilled in the art.

Additionally, the container is constructed such that animals cannot escape therefrom such as by gnawing through the container. Accordingly, various sections of the container interior, such as the lid and the vent areas, may be lined with wire mesh as in conventional containers.

For the illustrated embodiment, the lid includes fold line 8 so as to define first lid portion 9 and second lid portion 10. Preferably, the lid includes tabs 11 foldable over flange 6, the purpose of which is described below.

Figure 2:
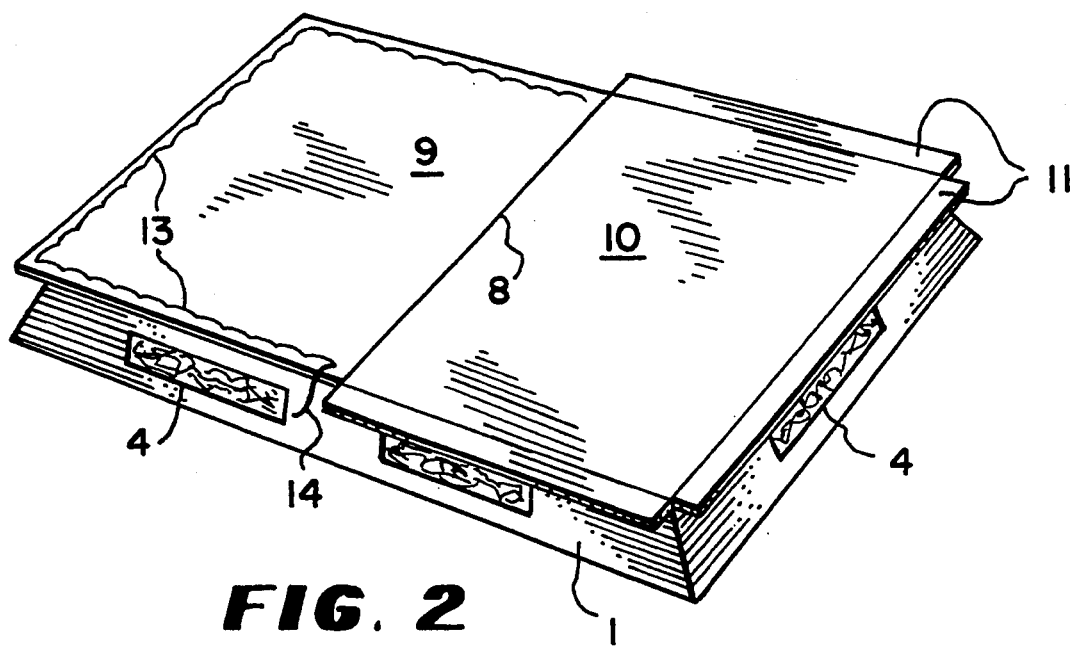
FIGS. 2, 3 and 4 are each perspective views of the container during various stages of use for transporting animals.

For transporting laboratory animals, lid 2 is placed on the flange of base 1, as shown in FIG. 2, such that the lid and base define a volume for receiving one or more laboratory animals therewithin. The first lid section 9 is attached to the flange of the base with removable stitching 13. For example, single thread chain stitching may be sewn along the periphery of the first lid section as shown in FIG. 2. Single thread chain stitching consists of consecutively interlaced loops of a common thread. Unless the end of the thread is tied to the last loop or otherwise anchored, pulling on it will release the entire series of stitches.

More specifically, for the illustrated embodiment, the lid is placed on the base, tabs 11 are folded over the adjacent portion of the flange, and the folded tabs and flange are sewn together with the removable stitching. Although the lid could be attached directly to flange 6, i.e., without the use of the foldable tabs, such tabs may provide a more secure attachment and assist in properly aligning the lid with the base during assembly. One end of the stitching includes pull thread 14, the purpose of which is described in detail below.

After completing attachment of the first lid section to the base, second lid section 10 may be folded along fold line 8 to provide access to the containment volume. After placing one or more animals in the container, second lid section is closed and attached to the flange of the base.

Figure 3:
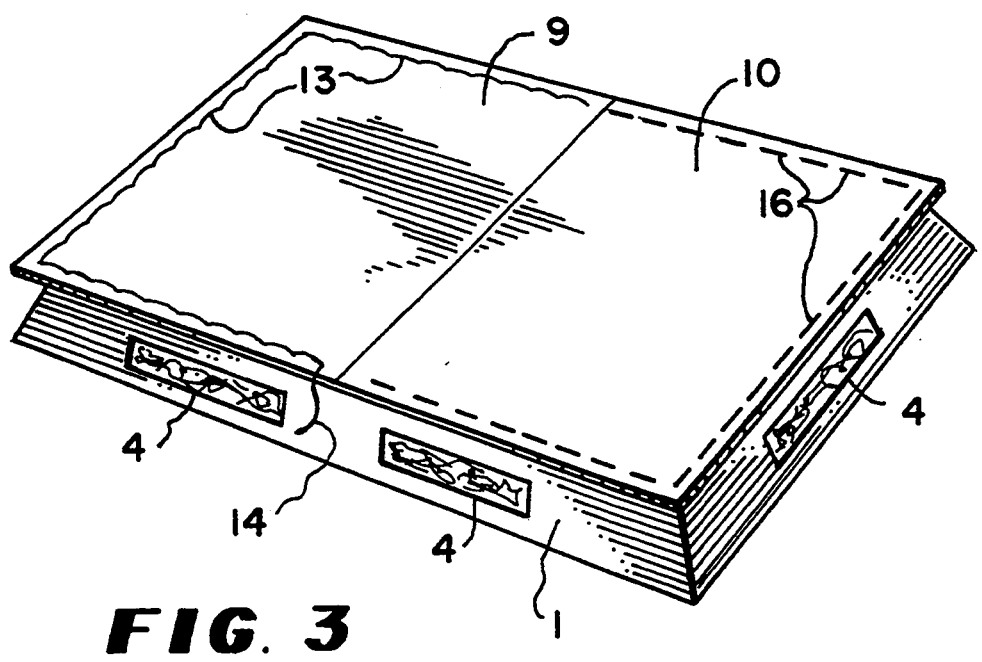

For the illustrated embodiment, the second lid section preferably includes foldable tabs 11 as provided for the first lid section. Although the second lid section may be attached to the flange of the base with stitching, similar to attachment of the first lid section, it is preferred to attach the second lid section by other methods which are less disturbing to the contained animals. As shown in FIG. 3, the second lid section may be attached with mechanical fasteners 16, such as staples, clips or rivets. Alternately, the second lid section may be attached using an adhesive, such as by a hot melt gluing process.

After completing attachment of the second lid section, the container appears as in FIG. 3 and is ready for transport from the supplier to a desired destination. If desired, pull thread 14 may be affixed to the container by a removable cover, such as tape or adhesive-backed paper, to prevent the pull thread from being pulled or snagged during transport. This cover can be removed after the container reaches its destination.

Figure 4:
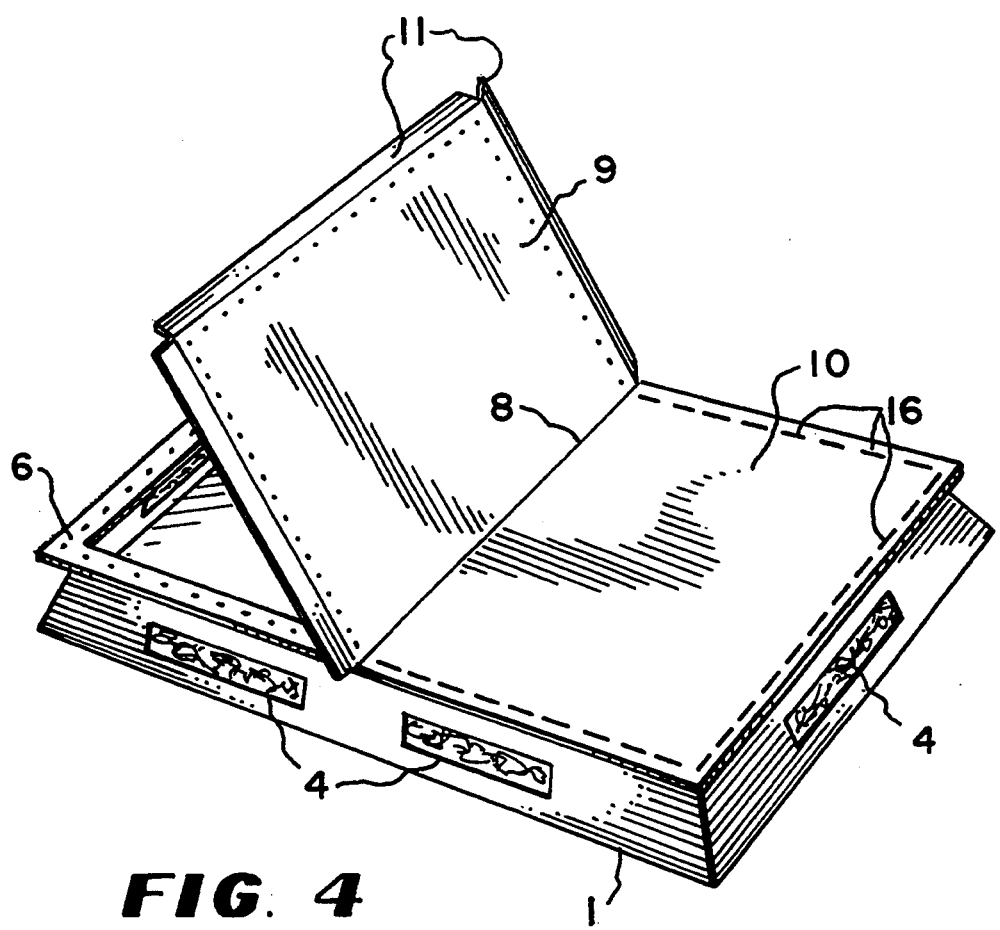

The receiver of the container opens the container by detaching first lid section 9 from the base. More specifically, pull thread 14 is grasped and pulled to remove stitching 13, whereby first lid section 9 may be opened easily by folding along fold line 8, as shown in FIG. 4, and animals may then be removed from the container.

Various modifications of the described embodiment are within the scope of the invention. For example, although the lid of the described embodiment includes only one fold line, centrally located on the lid of the described embodiment, such that the first and second lid portions have approximately the same area, the fold lines may be otherwise located provided that the end lid portions when opened provide access for placing animals in, or removing animals from, the container.

Additionally, if desired, the first lid section can be provided with means for temporarily latching the first lid portion to the base. For example, a keystoned shaped tab can be provided at the opening end of the first lid section for insertion in a matching slot in the adjacent portion of the flange of the base. This feature allows for temporarily latching the first lid section when removing several animals from the container to prevent escape of the animals.

Other variations would be evident to persons skilled in the art.

We claim:

1. A container for transporting laboratory animals comprising a base and a lid, said base and lid when assembled defining a volume for receiving one or more laboratory animals therewithin, the base including a flange for contacting the lid, the lid being foldable along a fold line defining (a) a first lid portion removably attached to the flange of said base with removable thread stitching and (b) a second lid portion attached to the flange of said base by mechanical fasteners or an adhesive.

2. The container of claim 1 wherein the removable stitching is single thread chain stitching.

3. The container of claim 1 wherein the second lid portion is attached to the flange with mechanical fasteners.

4. The container of claim 1 wherein the second lid portion is attached to the flange with an adhesive.

5. The container of claim 1 wherein the flange extends around the periphery of the base.

6. The container of claim 5 wherein the lid includes tabs foldable over the flange.

7. A method of transporting laboratory animals which comprises:
(a) providing a container comprising a base and a lid, said base and lid when assembled defining a volume for receiving one or more laboratory animals therewithin, the base including a flange for contacting the lid, the lid being foldable along a fold line defining (i) a first lid portion removably attached to the flange with removable stitching and (ii) a second lid portion;
(b) placing one or more animals into the container;
(c) closing the container by attaching the second lid portion to the flange;
(d) transporting the container to its destination;
(e) removing the stitching and folding back the first lid portion along the fold line, and
(f) removing the animals from the container.

* * * * *